Patented May 21, 1929.

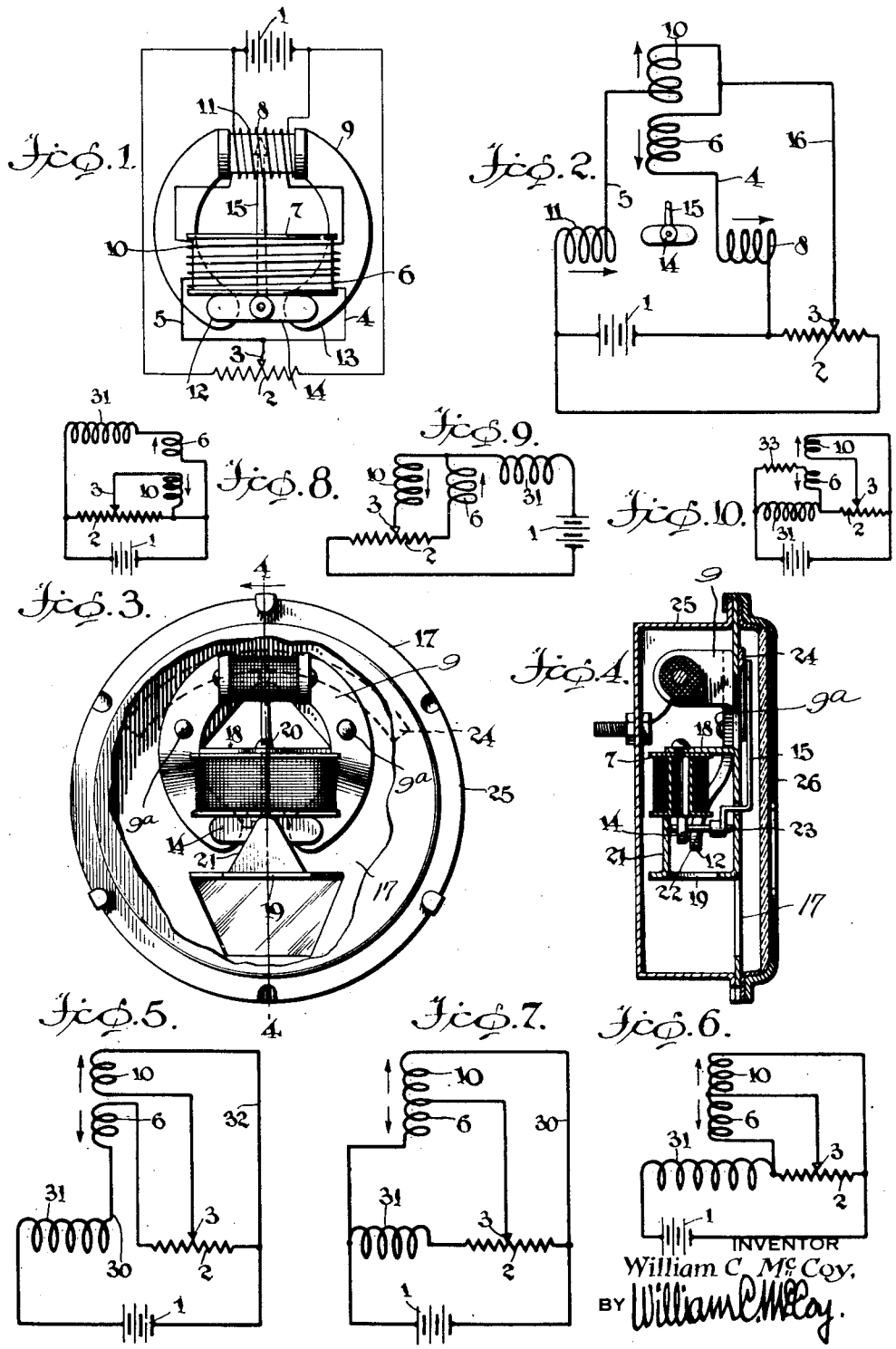

1,713,850

UNITED STATES PATENT OFFICE.

WILLIAM C. McCOY, OF CLEVELAND, OHIO, ASSIGNOR TO THE CLEVELAND TRUST COMPANY, OF CLEVELAND, OHIO, A CORPORATION OF OHIO.

ELECTRICAL INDICATING INSTRUMENT AND SYSTEM OF CONTROL THEREFOR.

Application filed January 8, 1925. Serial No. 1,299.

My invention relates to electrically operated indicating instrumentalities, and it is particularly directed to an instrument wherein the indicating element is actuated by the combined influence of a magnetic field that is substantially proportional to the applied voltage and of actuating coils that establish a reversible magnetic field in quadrature with the exciting field.

Instruments in this class that have heretofore been proposed, such, for instance, as those described in Henderson's U. S. Letters Patent No. 1,152,730, embody means for establishing exciting fields that are not strictly proportional to the applied voltage and that vary in intensity, independently of the applied voltage, for different positions of the indicating vane. In these previously suggested instrumentalities, it was also necessary to employ an air core which rendered the instrument commercially expensive and difficult to apply to the severe service conditions encountered in the automotive industry at the present time, where such instruments are subjected to intense vibration and where a greater certainty of operation is required and a greater intensity of the effective magnetic field is desired than is obtainable in previously known instruments of inexpensive construction.

The present invention provides indicating instrumentalities, the indications of which are substantially independent of the applied voltage, and the inherent nature of which provides instruments of very rugged construction that may be inexpensively manufactured. Furthermore, these instrumentalities employ a more intense magnetic field than has heretofore been obtainable, for positioning the indicating vane.

The general object of the present invention is to devise a remotely controlled indicating instrument of inexpensive and rugged construction that is substantially independent, in its operation, of the applied voltage, and that is eminently suited for use with automotive vehicles, but which may be adapted for any other service requiring the transmission of indications from a remote point to a station.

A further object of my invention is to devise a system of electrical control for these instruments that shall have the fewest obtainable number of parallel circuits, and that shall have the greatest total resistance in its series connected circuits in order to avoid the use of expensive high resistance wire in the various instrument windings to thereby reduce the energy consumption of the instrument and render it less expensive to manufacture.

The advantages to be derived from the practice of my invention will be apparent from the accompanying specification and drawings, wherein I have illustrated instrumentalities embodying my invention that are particularly suitable for use in connection with the indication of the level of fuel in the fuel tanks of automotive vehicles. It is to be understood, however, that my invention is not to be limited to this particular application thereof, but that it may be extended to any other field of use to which the principles thereof, as set forth in the appended claims, may be applied.

Figure 1 of the accompanying drawings is a diagrammatic plan view of an instrumentality constructed in accordance with my invention embodying a diagrammatic representation of both the indicating device and the associated control circuit.

Figure 2 of the accompanying drawings is a diagram of the electric circuit forming a part of the instrumentality shown in Figure 1.

Figure 3 is a plan view of the indicating device illustrated diagrammatically in Figure 1.

Figure 4 is a lateral sectional view of the instrument shown in Figure 3, taken substantially on the line 4—4 looking in the direction of the arrow applied thereto.

Figure 5 illustrates a modification of the control circuit employing a single field winding and differentially energized actuating coils.

Figure 6 is a further modification of the control circuit shown in Figure 5 in which a single field winding is connected in series with the control rheostat.

Figure 7 is an additional modification in which one actuating coil is connected in parallel relation with the field coil, wherein the actuating field is composed of a variable component and a component of substantially the magnitude of the applied voltage that is opposed and reversed by the variable component.

Figure 8 is a further modification of the control system shown in Figure 7, the control rheostat being connected in shunt relation with the field coil.

Figure 9 shows a modification in which the actuating coils are connected in parallel relation and only one actuating coil is controlled by the rheostat; and Figure 10 is a modification in which one of the actuating coils and the field coil are connected in parallel relation.

The instrumentality that is diagrammatically illustrated in Figure 1, comprises a battery 1, that may, in the application contemplated, be the storage battery of an automobile, a resistance element 2 which is connected in shunt relation therewith and energized therefrom, a contact member 3 which is adapted to be moved to various positions along the resistance element 2 in accordance with the thing that is being indicated by the instrument, to control the proportion of current that flows in each of the two series-connected branch circuits 4 and 5, that, for convenience of illustration are distinguished in the diagram by being shown respectively in light and heavy lines.

The circuit 4 extends from the contact member 3 through an actuating coil 6, that is mounted on a core member 7 and a field-establishing coil 8, that is wound about a magnetizable core member 9 of substantially horse-shoe form. The core member 7 is preferably formed of magnetizable material.

The other circuit 5, which is shown in heavy line, extends from the contact member 3, through an actuating coil 10 that is wound on the core 7 in such direction as to oppose the energization set up by the coil 6, and through a field energizing coil 11 that is connected to the opposite side of the battery from that to which the circuit 4 is connected. The two circuits 4 and 5 are connected in series relation across the battery. The arrows inserted within the respective coils indicate the direction of the energization of the coils with respect to the core upon which they are wound.

The magnetic field piece 9, which is of horse-shoe form, is of soft iron or other magnetic composition that preferably has very low hysteresis characteristics which insures quick responses to changes in the cumulative energization of the coils 8 and 11. Since the coils 8 and 11 are of the same resistance and substantially the same number of turns and are connected in series relation across the terminals of the supply circuit, and since they are differentially energized through the movement of the contact member 3, the combined cumulative energization of these two coils is substantially proportional to the terminal voltage of the supply circuit. The coils 8 and 11 are wound upon the magnetic core 9 in such a way as to mutually energize the core 9 in the same direction and thereby establishing a magnetic field between the poles 12 and 13 of the core 9 that tends to aline a pivotally mounted magnetic armature 14, that carries an indicator 15 of conventional form, with the direction of the magnetic field between the poles. The magnetic armature 14 is a pivotally mounted magnetic element of conventional form that alines itself with the direction of the resultant magnetic field that is created by the combined influence of the coils 6, 10, 8 and 11, and that actuates the indicating element 15 in accordance with the positon of the contact element 3.

The core member 7, that is common to the windings 6 and 10 is either of magnetic material or of some non-magnetic body that will not interfere with the actuating field created by the coils 6 and 10. A slight magnetic lag is, however, desirable because it acts as a damper for the vane by preventing registration of every minor movement for the rheostate contact that may be produced by the swashing of fuel in the gasoline tank, by different inclinations of the machine, etc.

The operation of the previously described instrumentality may best be described by referring to Fig. 1 and Fig. 2 of the drawings wherein, if the contact member 3 occupies its extreme left hand position, the circuit 4 is shunted by the connection 16 extending from the common point of coils 6 and 10 to the terminal of coil 8. For this position of the contact member 3, coils 10 and 11 in the circuit 5 receive the entire voltage of the storage battery 1 and are, therefore, energized to their highest degree. As the contact element 3 is moved towards the center of the resistance element 2, the circuits 4 and 5 are differentially energized, the energization of the coils in circuit 5 decreasing as the energization of the coils in the circuit 4 increases until the contact element 3 reaches the center of the resistance element. In this position the circuits 4 and 5 are equally energized if they are each of the same resistance. Variation of the resistance of either circuit would change the performance of the system.

For this central position of the contact member 3, coils 6 and 10 mutually oppose and thereby neutralize the actuating field. The armature 14 therefore alines itself with the direction of the resultant field established by the coils 8 and 11, and the indicating vane points to the center of the scale.

If the contact member 3 is moved to the extreme left hand end of the resistance element 2, the current flowing through circuit 4 decreases proportionally as the current flowing through the circuit 5 increases, in accordance with well known potentiometer principles. Coil 10 then predominates and establishes a negative polarity for the actuating field that is established in the core 7.

It will, therefore, be evident that, if the contact element 3 is moved to the extreme right hand end of the resistance unit, the armature 14 will move the indicator to its extreme left hand position, whereas, when the contact element 3 reaches the mid-point of the resistance element the indicator 15 will move to the position shown in Figure 1, and as the contact element 3 moves to the left hand end of the resistance element the indicator 15 will, in turn, move to its extreme right hand position. These positions are each independent of voltage variations as also are the intermediate positions.

Having thus described the electrical characteristics of the instrumentality, the mechanical features of the indicator mechanism will be more fully described.

The base 17 of this instrument is composed of nonmagnetic sheet metal from which portions 18 and 19 are struck up to respectively provide a support for the actuating coil core 7 and for the armature 14. The upstanding ear 18 is of conventional form adapted to receive a screw 20 for securing the core 7 in place. The upstanding base portion 19 has a second portion 21 struck from its face to provide a pivotal support for one end of the armature shaft 22. The other end of the armature is pivoted in a depression 23 formed in the base 17. The indicator vane 15 is secured to the shaft 22 and swings therewith over a graduated scale 24, provided for convenient reading of the instrument indications. The core member 9 is supported directly from the base 17 of the instrument to which it is attached by rivets 9ª. A case 25 covers the instrument parts and a glass dial 26, of conventional design, protects the face of the instrument.

From a consideration of the above electrical and physical elements of the instrumentality herein described, it will be apparent that the connection of the energizing and actuating coils as proposed provides a series circuit for the instrument windings that greatly reduces the necessary electrical resistance of the individual windings, and therefore, provides an instrument that may have its windings formed of fine copper wire in lieu of the resistance wire required in other forms of instruments herebefore proposed.

The formation of the core member 9 so that it may be secured directly to the base of the instrument, and the unique method of forming one of the pivotal supports for the indicator shaft are also features of the invention. The construction insures an instrument of relatively inexpensive construction that requires less energy for its operation than instruments that have heretofore been proposed, and that has other advantageous features as heretofore set forth.

Figure 5 of the drawing shows a modification of the control circuit for the instrumentality herein proposed, wherein one circuit 30 is connected in shunt relation across the battery terminals and includes the windings of actuating coil 6, and field coil 31 that corresponds to coils 8 and 11 of the circuit diagram shown in Figure 2. A second circuit 32, that has one terminal connected to the contact member 3 and includes the actuating coil 10, affects variations in the polarity and intensity of the actuating field. Each of the windings 6, 10 and 31 preferably are of the same resistance, usually about 60 ohms, and the resistance element 2 is of substantially twice the resistance of one of the windings or about 120 ohms. The ampere turns of winding 10 will, therefore, be twice the ampere turns of winding 6 when both are fully energized, and therefore the resultant actuating field strength will be reversed in polarity and of substantially the same magnetic intensity for both extreme positions of the contact member 3.

Figure 6 of the accompanying drawing shows a circuit diagram wherein only one field coil 31 is used and wherein the field coil is connected in series relation with the differentially energized actuating coils 6 and 10 and the resistance unit 2. The greatest element of advantage in this circuit arrangement is the use of a single series circuit for the instrument which reduces the necessary resistance of the individual coils and of the rheostat, and also greatly reduces the energy consumption of the instrument without sacrificing the resultant field strength.

A characteristic of this particular control circuit for my instrument is the reduction of field strength that occurs at the extreme positions of the contact member. This gives greater range to the swing of the indicator vane and provides end scale graduations of more desirable size than for the intermediate positions where the readings are of less importance in connection with the quantity of fuel carried in automobile fuel tanks.

Figure 7 diagrammatically shows another control circuit and that may be conveniently applied to the instrumentality shown in Figures 3 and 4. Although the operation of this system differs materially from the operation of the system described in connection with Figure 6, the circuit is, in general, the same. The distinguishing feature of Figure 7 is that one terminal of coil 6 is connected to the battery terminal side of field winding 31 rather than to the other terminal of winding 31 as in Figure 6.

The operation of the arrangement shown in Figure 7 is such that for the extreme left hand position of the contact element 3, the windings 6 and 31 are connected in parallel relation with each other and the coil 10 is connected in series relation with the rheostat 2, whereas, for the other extreme position, the energization of coil 6 is increased and of coil 10 is decreased until it becomes substantially de-energized. It is therefore desirable in this circuit to employ a relatively low resistance winding for coil 31.

Figure 8 shows a modified form of the circuit arrangement illustrated in Figure 5. The coil 10 is here shown as independently controlled from the rheostat 2. The coils 6 and 31 are connected in series relation across the battery and the rheostat is connected directly across the battery terminals. In the circuit shown in Figure 8, actuating winding 10 opposes and reverses the field produced by coil 6.

Figure 9 shows an additional modification of the control circuit wherein the energization of coil 6 is opposed, neutralized and reversed by the energization of coil 10.

Figure 10 shows a control circuit in which actuating coil 6 is connected in parallel relation with coil 31 and rheostat 2 is connected in series with coil 31 across the battery 1. Coils 6, 10 and 31 may either be of the same resistance and coils 6 and 10 of the same number of turns, or the circuit for coil 6 may be so modified by the insertion of resistance, such as 33, as to provide a coil arrangement in which one component of the actuating field increases, in accordance with the position of the contact, to a point where the resultant actuating field is substantially neutralized for the mid position of the contact member.

The simplicity of this instrument will be apparent. There is no permanent magnet involved. The iron is of very soft, easily workable nature. The supports for the armature of the instrument are formed from the base plate. The field magnet piece is riveted directly to the base construction and the two coils of the actuating windings may be simultaneously wound on the core.

The proposed electrical circuit connections for the instrument coils are primarily of such a nature as to provide a very wide throw for the indicating vane. Certain of the circuit arrangements provide an instrument in which the graduations near the ends of the scale will be increased and the unit defections over the central zone of the readings and also to provide an instrument having increased sensitivity at the scale extremities.

Although I have described only a few preferred applications of my invention, the invention should not be construed as limited either to use with automotive vehicles or to the particular form or arrangement of the electrical circuits employed. I desire, therefore, that only such limitations shall be imposed as are set forth in the spirit and scope of the accompanying claims.

What I claim is:

1. An indicating instrumentality comprising a source of electrical energy, a soft iron field piece fixed in position, a fixed winding mounted on said field piece for magnetically energizing said field piece, a resistance element connected in series relation with said winding across said source of energy, an adjustable contact member adapted to establish electrical connections at intermediate points along said resistance element, an actuating coil, connected at one end to said contact member, a second actuating coil also connected at one end to said contact member to oppose, neutralize and reverse the magnetic field produced by said first actuating coil for predetermined positions of said contact member, the remaining terminal of one of said coils being connected to a terminal of the fixed winding mounted on said field piece, the remaining terminal of the other of said coils being connected to said source of electrical energy, and a magnetically responsive armature mounted for movement in the field produced by the soft iron field piece and controlled by the combined influence of the field winding and the actuating coils.

2. An indicating instrumentality comprising a source of electrical energy, a soft iron field piece fixed in position and having a magnetic gap between opposed portions thereof, a winding mounted on the field piece for magnetically energizing said field piece, a resistance element connected in series relation with said winding across said source of energy, a magnetically responsive armature pivotally mounted within the field of influence of the magnetic gap of said field piece, an indicator operated by said armature, a contact member that is movable along said resistance element, and electromagnetic means connected with said contact member adapted to create a reversible actuating field in angular relation with the magnetic field developed by said winding, said armature being adapted to be controlled by the combined influence of said actuating field and the field produced in the gap of said core.

3. An indicating system comprising a source of electric energy, a resistance element, a contact member, means for moving said contact member along said resistance element in accordance with changes in the thing being indicated, a magnetically actuated indicating mechanism remote from said resistance element, an energizing coil, said coil and resistance elements being connected in series relation to said source and adapted to produce a magnetic field proportional to the voltage of said source of energy, and a pair of actuating coils concentrically wound in opposed relation and connected in series relation to the terminals of said resistance element and having their common point electrically connected to said contact member, said indicating mechanism being actuated by the combined influence of said energizing and said actuating coils.

4. An indicating system comprising, a source of direct electric current, a pair of windings producing opposed magnetic fields, means for differentially varying the degree of excitation of said windings, the individual excitations of said windings being also substantially proportional to changes in the voltage of said source, a third winding energized from said source producing a magnetic field that is proportional to the voltage of said source and in angular relation to the magnetic field produced by said pair of windings, at least one of said pair of windings being connected in series with said third winding, and magnetically responsive mechanism actuated by the combined influence of said pair of windings and said third winding.

5. An indicating instrumentality comprising a source of electrical energy, a pivotally mounted magnetically influenced armature, a winding having one terminal connected to the source of energy and arranged to establish a substantially uniform field of influence for the armature that changes substantially proportionately to changes in the voltage of said source of energy, a second winding connected to the other terminal of the first winding and in series with the first winding and adapted to establish a magnetic field in quadrature with the field established by the first winding, a third winding connected to the remaining terminal of the second winding and to the source of energy and arranged concentric and coincident with the second winding and adapted to create a magnetic field opposing that established by the second winding, a resistance unit having one terminal connected to the point of connection of the first and second windings and its other terminal connected to a terminal of the third winding which is also connected to the source of energy, and a contact member movable along said resistance element and connected to the second and third windings to control the relative energization of said second and third windings.

In witness whereof, I have hereunto signed my name.

WILLIAM C. McCOY.